United States Patent

[11] 3,622,357

| [72] | Inventor | Hjalmar A. Tillman<br>Southgate, Mich. |
|---|---|---|
| [21] | Appl. No. | 56,292 |
| [22] | Filed | July 20, 1970 |
| [45] | Patented | Nov. 23, 1971 |
| [73] | Assignee | BASF Wyandotte Corporation<br>Wyandotte, Mich. |

[54] AUTOMATIC FEED SYSTEM FOR TREATING BREWERY PASTEURIZER WATER
10 Claims, 4 Drawing Figs.

[52] U.S. Cl. ................................................ 99/249, 99/214, 99/362
[51] Int. Cl. ........................................................ B65b 55/06
[50] Field of Search ........................................................ 99/249, 251, 252, 360, 359, 361, 362, 363, 364, 365, 366, 367, 151, 211, 214

[56] References Cited
UNITED STATES PATENTS

| 979,796 | 12/1910 | Pinkney | 99/359 |
|---|---|---|---|
| 1,027,894 | 5/1912 | Pindstofte | 99/360 |
| 2,203,141 | 6/1940 | Gruetter | 99/249 |
| 2,262,030 | 11/1941 | Meyer | 99/362 |
| 2,466,769 | 4/1949 | Herold | 99/362 |

*Primary Examiner*—Robert W. Jenkins
*Attorneys*—Arnold S. Weintraub, Bernhard R. Swick, Joseph D. Michaels and Robert E. Dunn ABSTRACT: Brewery pasteurizing waters are automatically treated with chemical compounds, such as slimecides, water conditioners, corrosion inhibitors, and the like according to the present invention. The reservoirs from the pasteurizing waters communicate with sources of the chemical compounds through suitable apparatus capable of delivering the chemicals thereat. Valve means operatively connected to timing means open and close in predetermined sequence to permit delivery of the chemical compounds to the reservoirs.

INVENTOR
HJALMAR A. TILLMAN

BY Arnold S. Heintraub

ATTORNEY

3,622,357

AUTOMATIC FEED SYSTEM FOR TREATING BREWERY PASTEURIZER WATER

BACKGROUND OF THE INVENTION

1. Field of the Invention

The present invention concerns pasteurizing processes in breweries and the like. More particularly, the present invention concerns automated means for chemically treating the pasteurizing water with slimecide, water conditioners, corrosion inhibitors and the like.

2. Prior Art

Various alcoholic beverages, such as beer, and the like are pasteurized after they are dispensed into suitable containers such as bottles, cans, and the like. Pasteurizing is accomplished by passing the filled containers through various stages or zones of a housing, commonly called a pasteurizer, wherein they are contacted with "pasteurizing water." The more sophisticated pasteurizers provide for the recycle and reuse of this water a multiplicity of times. With this constant reuse, there is a tendency for organic matter to become viable in the water, as well as for scale buildup on the walls of the pasteurizer. Therefore, the prior art has taught the manual addition of powdered slimecide, water conditioners, corrosion inhibitors and the like to the pasteurizing water.

The problems associated with manual addition are apparent. For instance, there is man-hour expense, the problems of overaddition and underaddition of the chemicals and the like, for which there has not been a simple expedient to correct this.

It will become apparent to those skilled in the art that these problems are overcome by the present invention by providing a fully automated system for treating the pasteurizing water.

SUMMARY OF THE INVENTION

The present invention provides for a fully automated system for treating pasteurizing waters with chemical water treating agents, such as slimecide, water conditioners, corrosion inhibitors, and the like.

The present invention generally provides a conventional pasteurizer having separate stages or zones for treating the beverage containers with pasteurizing water from reservoirs associated with each of the zones. At least one source for chemical agents for treating the pasteurizing water in each of the reservoirs is provided along with fluid delivery means including branched conduits communicating between the source for chemical water treating agents and the pasteurizer reservoirs. The fluid delivery means preferably includes pumping means or the like for forcing the liquid through the conduits although this purpose may be accomplished by other means, such as gravity flow. The flow of chemical agents into the pasteurizer reservoirs is regulated by a plurality of valves operable by remote means, e.g., fluid pressure operable diaphragm valves, solenoid valves, etc., each valve being provided in a branch conduit which, in turn, is associated and connected with each of the pasteurizer reservoirs. A timing means is provided which is operatively connected to each of the valves through remote control means, e.g., electrical, pneumatic, etc., such that the chemical agents can be delivered from the source thereof into any one or more of the pasteurizer reservoirs in a predetermined timed sequential arrangement.

Means are also included for sensing the level of chemical agent in the source or sources whereby upon depletion thereof, the pumping means, etc., if any, is automatically shut off.

For a more complete understanding of the present invention, reference is made to the following detailed description and the accompanying drawing. In the drawing, like reference characters refer to like parts throughout the several views.

DESCRIPTION OF THE PREFERRED EMBODIMENT

Figure 1:
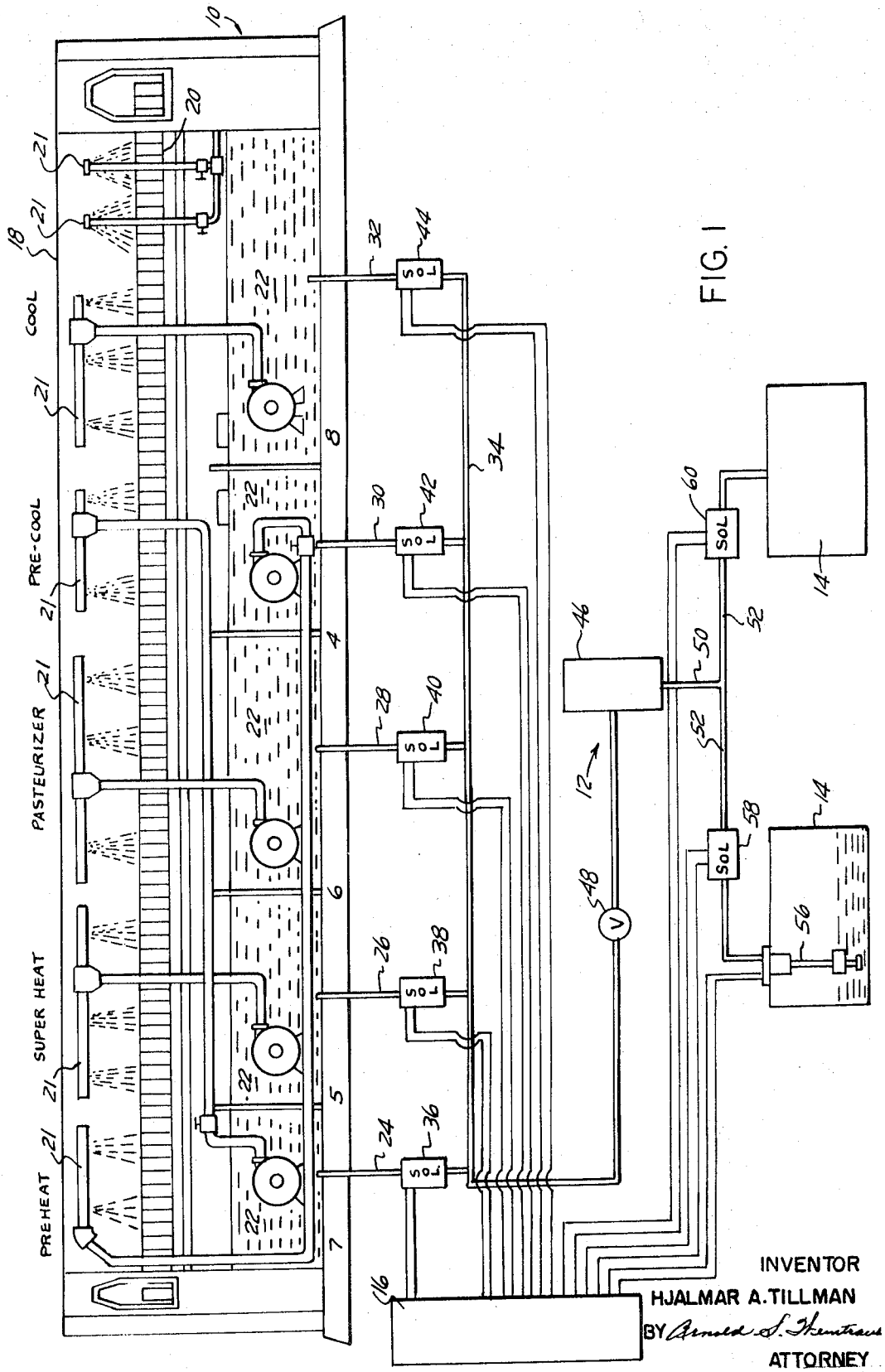
FIG. 1 is a schematic side elevation view of a brewery pasteurizer and a schematic diagram of a presently preferred embodiment of the feed and control system of the present invention.

As can be seen from FIG. 1, the present invention generally provides a pasteurizer generally indicated at 10, which is in fluid communication with the outlet side of a pumping means, generally indicated at 12. The inlet side of pumping means 12 is in fluid communication with at least one source such as reservoir 14 of chemical water treating agent, such as slimecide, water conditioners, corrosion inhibitors, or the like. An electrically activated cammed timer 16 is provided to regulate delivery of the chemical agent to the pasteurizer in the manner hereinbefore described and which is more exactly detailed below.

With reference to FIG. 1, it is seen that pasteurizer 10 includes a housing 18 which is internally partitioned into various zones as depicted in the drawing. Horizontally extending throughout the pasteurizer is a conveying means 20 for transporting filled beverage containers through the various zones of the pasteurizer. Suitable spraying or dispensing means 21 conventionally disposed above conveying means 20 is provided for contacting the containers with the pasteurizing or treating water. A plurality of reservoirs 22, each of which is associated with each of the zones, are provided for collecting and storing the pasteurizing water. Additionally, the reservoirs 22 are provided with suitable circulating means for delivering the water to the spraying or dispensing means as well as for transferring the water from one zone to the other, as shown. For example, based on heat exchange principles, it is often advantageous to transfer water from the preheat zone to the precooling zone, and so forth, thus, the circulating means are provided. It is to be understood, however, that the construction of the pasteurizer forms no part of the instant invention, per se. Suitable pasteurizer constructions are set forth in U.S. Pat. No. 2,282,187 which details the type of pasteurizer contemplated by the present invention.

The reservoirs 22, as shown in the drawing, are in fluid communication with pumping means 12 through branch conduits 24, 26, 28, 30 and 32, which are, in turn, connected to main flow conduit 34, which is connected to pumping means 12 at the outlet side thereof. A plurality of valves 36, 38, 40, 42 and 44 interposed in the branch conduits 24, 26, 28, 30 and 32, respectively, are provided to regulate the amount of chemical agent entering into the reservoirs 22 and in a presently preferred embodiment of the instant invention the valves are electroresponsive valves, such as conventional solenoid valves.

Pumping means 12, preferably, comprises a conventional positive displacement pump 46 having an inlet and an outlet. The pump 46 can be either an electrical pump, pneumatic pump or the like. Such pumps are well known in the art and commercially available. Pumping means 12 also includes a needle valve 48 disposed in the main flow line 34 proximate the outlet of the pump 46. The needle valve 48 regulates the rate of flow of the chemical agents as well as preventing the flow of unduly large solid particles into the reservoirs 22.

A conduit 50 is connected to the inlet of pump 46 at one end thereof. The other end of the conduit 50 is either connected to a liquid level control device 56 or to a plurality of branch conduits 52 (as shown in the drawing) which, in turn, are each connected to liquid level control device 56 for delivering fluid from an associated reservoir 14. Liquid level control device 56 generally comprises a housing having internal conduits connected to the branch conduits 52 for delivering fluid from the reservoirs 14 to the pump 46 wherefrom it is delivered to the pasteurizer reservoir 22. Liquid level control device 56 also includes sensing means for determining the level of chemical water treating agent contained therein. The sensing means is operatively connected to the timer 16 such that upon depletion of the source it can automatically shut off the timer. This is achieved by a cutoff switch disposed in the timer circuit and electrically connected to the sensing means. The exact design and construction of the liquid level control device 56 is described in copending U.S. Pat. application Ser. No. 807,609, entitled "Liquid Level Control Device," and filed on Mar. 17, 1969, the disclosure of which is hereby incorporated by reference.

Because of the nature of the chemical agents used to treat the pasteurizing water it is desirable to maintain them in separate sources or reservoirs 14. It is also desirable to employ separateness because it is advantageous to introduce these agents into the zones of the pasteurizer at different intervals. Thus, the chemical agents are shown as being contained in two reservoirs 14. One reservoir contains the slimecide and the other contains chemicals, such as water conditioners, corrosion inhibitors and the like, which can be readily and advantageously mixed together for simultaneous introduction into the preselected reservoir 22.

In order to achieve and maintain separations of delivery from the sources, branch conduits 52 are provided with valves 58 and 60, respectively, disposed therein. These valves 58 and 60 are electroresponsive and preferably comprise solenoid valves similar to valves 36, 38, 40, 42 and 44.

Figure 2:
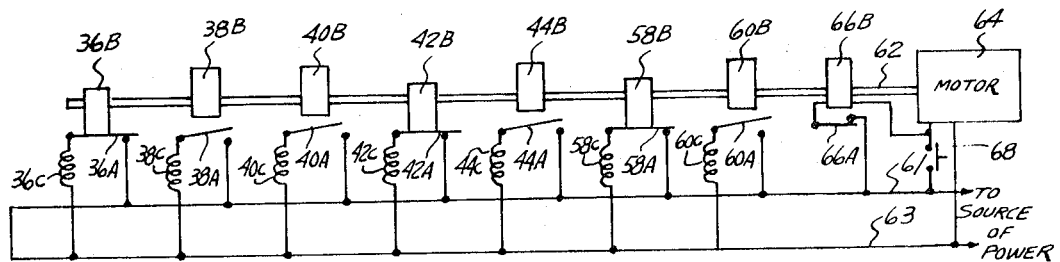
FIG. 2 is a schematic diagram of a step in the cammed timer sequence employed in the system of FIG. 1.

As shown in FIGS. 1 and 2, there is provided an electrically actuated timed controlling mechanism referred to herein as timer 16. The timer 16 is provided with a plurality of switches or switching blades 36A, 38A, 40A, 42A, 44A, 58A and 60A which are intermittently activated in a manner described hereinafter.

Each of the switches are intermittently closed or activated by the engagement thereof with a cam or eccentric mounted on a camshaft 62. As shown in FIG. 2, a plurality of cams 36B, 38B, 40B, 42B, 44B, 58B and 60B are axially rotatably mounted on camshaft 62 which is positioned in close proximity to the switches. The cams, which are axially spaced from each other have their eccentric positions offset or aligned, as the case may be, in a predetermined manner to afford a preselected fluid delivery to the desired zones of the pasteurizer.

The camshaft 62 is rotated by motor 64 which is, in turn, connected to a suitable power source lines 61 and 63. Thus, as the camshaft is rotated, preselected cams will engage their respective switches thereby closing same. When the switches are closed, the electrical circuits from the power supply lines 61 and 63 supply power to the respective solenoids thereby opening the respective valves positioned in the fluid conduits. This permits the respective chemical water treating agent to be delivered from the respective source, i.e., reservoir 14, into the desired pasteurizer reservoir 22. After further rotation of the camshaft, the cam will cease to engage the respective switch thereby opening same and breaking the circuit to close the valve associated therewith, which halts fluid flow past the valve. A further explanation of the operation of this timer mechanism is more comprehensively described subsequently.

It is to be understood, however, that the exact construction of the cammed timer is not critical hereto. However, for purposes of explanation, the above-described cammed timing mechanism will be assumed.

OPERATION OF THE SYSTEM

Figure 3:
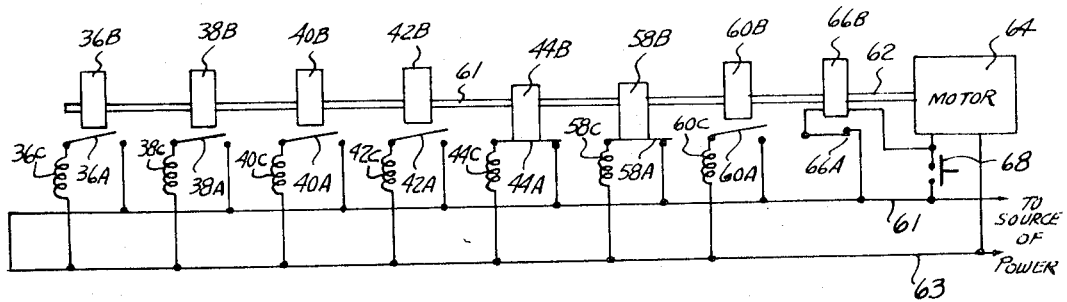
FIG. 3 is a schematic diagram of another step in the cammed timer sequence employed in the system of FIG. 1.
Figure 4:
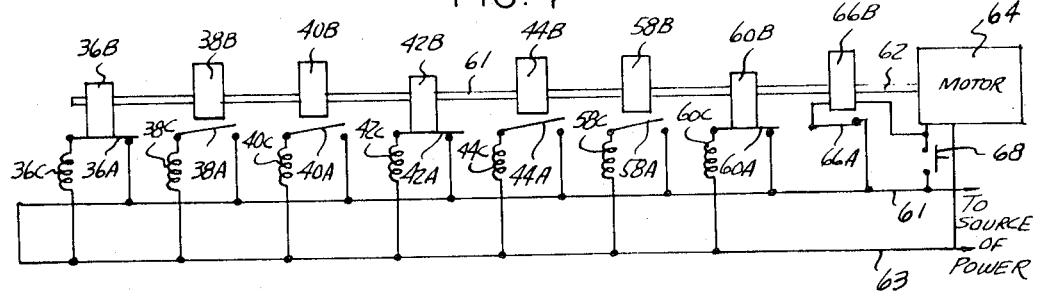
FIG. 4 is a schematic diagram of another step in the cammed timer sequence employed in the system of FIG. 1.

With reference now to FIGS. 2-4, the operation of a suitable cycle is therein depicted and hereinafter described.

Assuming all contacts are properly made and that the reservoir 14 associated with valve 58 contains slimecide and the other reservoir 14 associated with valve 60 contains corrosion inhibitors, water conditioners and the like, the preferred mode of operation is as follows:

As depicted in FIG. 2, upon actuation of the motor 64, by suitable manual momentary contact switch means 68, the shaft 62 rotates such that cam 66B disengages its respective switching blade to close switch 66A whereby pressure may be removed from momentary contact switch means 68 disengaging same and cams 36B, 42B and 58B engage their respective switching blades to close switches 36A, 42A and 58A thereby supplying electrical energy to solenoids 36C, 42C and 58C, respectively. This electrical actuation, thus, opens valves 36, 42 and 58 thereby permitting flow of the slimecide through the respective conduit 52, main flow conduit 34, conduits 24 and 30 and into the reservoirs 22 associated with the opened valves as the pump 46 exerts its influence. Because the remaining cams do not engage the switches, they do not close to open their respective valves, and, therefore, no fluid flows from the other reservoir 14 or into any of the other pasteurizer reservoirs 22.

With reference to FIG. 3, because of the configuration of the cams as the shaft 62 rotates, cams 36B and 42B disengage their respective switches thereby closing the associated valves 36 and 42 while cam 58B remains in contact with the switching blade 58A to keep the associated valve 58 open. As cams 36B and 42B disengage their respective switching blades, concurrently cam 44B engages switch 44A, thereby opening valve 44. This permits slimecide to be pumped into the reservoir associated with valve 44. Next as shown in FIG. 4, cams 58B and 44B disengage their respective switches to open same thereby closing their respective valves 58 and 44, while concurrently cams 60B, 36B and 42B engage theirs to close their switches and open the respective valves 60, 36 and 42. This permits the chemical agents in the other source reservoir 14 to be pumped by the pump 46 through valve 60 into the reservoirs associated with valves 36 and 42.

By the rotation of the camshaft 62 continuous engagement and disengagement of various switches other than 66A is effectuated by the respective cams coming into contact therewith so that the sequence then proceeds as follows. Valves 36 and 42 are closed as valve 38 opens; as valve 38 closes, valve 40 opens; then, valve 44 opens as valve 40 closes.

During this sequence, valve 60 has been maintained in an open position. Valves 60 and 44 then close simultaneously as the final step in this treating sequence. As the last step in the sequence is completed, i.e., valves 60 and 44 closing, normally closed switch 66A is opened by cam 66B entering into engagement therewith. The engagement of cam 66B and switch 66A automatically opens up the circuit to motor 64, thereby shutting off the motor.

To restart the system, the manual momentary contact switch 68 is actuated which turns on the motor thereby rotating camshaft 62 to disengage cam 66B from switching blade 66A, to close the switch once again.

It should be noted, however, that if any of the reservoirs 14 become depleted, the sensing means associated with liquid level control device 56 will emit an electrical impulse to the timer 16 to shut it off, thereby overriding and stopping the entire process.

What is claimed is:

1. A system for treating brewery pasteurizing water comprising:
    a. a pasteurizer having treating water reservoirs and means for delivering the water into contact with alcoholic beverage containers;
    b. at least one reservoir for chemical water treating agent;
    c. a fluid delivery means including branched conduits communicating between the water treating agent reservoir and the pasteurizer reservoir;
    d. a plurality of valves, each of which is provided in a branch conduit which, in turn, is associated and connected with each of the pasteurizer reservoirs; and
    e. timing means operatively connected to each of the valves such that the chemical water treating agent can be delivered from the reservoir therefor into any one of the pasteurizer reservoirs in a predetermined timed sequential arrangement.

2. The system of claim 1 and further including a liquid level control device for determining the level of chemical water treating agent in the reservoir therefor and operatively connected to the timing means such that upon depletion of the reservoir the system is automatically deenergized.

3. The system of claim 1 wherein the fluid delivery means includes a pump.

4. The system of claim 1 wherein the timing means comprises an electrically actuated cammed switching timer.

5. The system of claim 4 wherein the valves are electrically actuated valves.

6. The system of claim 4 wherein a plurality of chemical water treating agent reservoirs are employed, each of which has a branch conduit of the delivery means associated with and connected thereto with a valve provided in each conduit.

7. The system of claim 6 wherein the valves are electrically actuated valves.

8. The system of claim 7 employing two water treating agent reservoirs and five pasteurizer reservoirs.

9. The system of claim 8 wherein the fluid delivery means includes a pump.

10. A system for treating brewery pasteurizing water comprising:

a. a pasteurizer having five treating water reservoirs and means for delivering the water into contact with beer containers;
b. a chemical-containing reservoir for slimecide;
c. a chemical-containing reservoir containing corrosion inhibitors, water conditioners and the like;
d. a fluid delivery means including pumping means and branch conduits communicating between the chemical-containing reservoirs and the pasteurizer reservoirs;
e. a plurality of liquid level control devices, each of which is disposed in each of the chemical-containing reservoirs and which are connected to branch conduits;
f. a plurality of electrically actuated valves, each of which is provided in each of the branch conduits, and which are associated and connected with each of the pasteurizer reservoirs and each of the chemical-containing reservoirs; and
g. a cammed switching timer operatively connected to each of the electrically actuated valves such that the chemicals contained in reservoirs therefor can be delivered therefrom into any one of the pasteurizer reservoirs in a predetermined timed sequential arrangement.

* * * * *